(12) United States Patent
Couillet et al.

(10) Patent No.: US 7,431,089 B1
(45) Date of Patent: Oct. 7, 2008

(54) METHODS AND COMPOSITIONS FOR SELECTIVELY DISSOLVING SANDSTONE FORMATIONS

(75) Inventors: Isabelle Couillet, Houston, TX (US); John W. Still, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/767,579

(22) Filed: Jun. 25, 2007

(51) Int. Cl.
E21B 43/27 (2006.01)

(52) U.S. Cl. .................................................. 166/307

(58) Field of Classification Search ........................ None
See application file for complete search history.

(56) References Cited

U.S. PATENT DOCUMENTS

| | | | | |
|---|---|---|---|---|
| 2,265,962 A | * | 12/1941 | Bent et al. ................... | 166/281 |
| 3,951,827 A | | 4/1976 | Burroughs | |
| 4,090,563 A | | 5/1978 | Lybarger | |
| 4,479,543 A | * | 10/1984 | Kalfayan et al. ............ | 166/300 |
| 4,599,182 A | * | 7/1986 | Young et al. ................ | 507/224 |
| 4,646,835 A | * | 3/1987 | Watkins et al. ............. | 166/295 |
| 5,039,434 A | * | 8/1991 | Watkins et al. ............. | 507/234 |
| 5,529,125 A | * | 6/1996 | Di Lullo Arias et al. ..... | 166/307 |
| 6,207,620 B1 | | 3/2001 | Gonzalez et al. | |
| 6,209,646 B1 | * | 4/2001 | Reddy et al. ................ | 166/300 |
| 6,435,277 B1 | | 8/2002 | Qu | |
| 6,436,880 B1 | | 8/2002 | Frenier | |
| 6,443,230 B1 | * | 9/2002 | Boles et al. ................. | 166/307 |
| 6,506,711 B1 | | 1/2003 | Shuchart | |
| 6,521,028 B1 | | 2/2003 | Frenier | |
| 6,531,427 B1 | | 3/2003 | Shuchart | |
| 6,632,805 B1 | | 10/2003 | Liebeskind | |
| 6,703,352 B2 | | 3/2004 | Dahayanake | |
| 6,761,220 B2 | * | 7/2004 | Blauch et al. ............... | 166/307 |
| 6,806,236 B2 | | 10/2004 | Frenier | |
| 7,114,567 B2 | | 10/2006 | Chan | |
| 2002/0070022 A1 | | 6/2002 | Chang | |
| 2002/0104657 A1 | | 8/2002 | Frenier | |
| 2002/0170715 A1 | | 11/2002 | Frenier | |
| 2004/0152601 A1 | | 8/2004 | Still | |
| 2004/0209780 A1 | | 10/2004 | Harris | |
| 2004/0254079 A1 | | 12/2004 | Frenier | |
| 2005/0113263 A1 | | 5/2005 | Brown | |
| 2006/0048943 A1 | | 3/2006 | Parker | |
| 2006/0054325 A1 | | 3/2006 | Brown | |
| 2006/0058197 A1 | | 3/2006 | Brown | |
| 2006/0113078 A1 | | 6/2006 | Nguyen | |
| 2006/0157243 A1 | | 7/2006 | Nguyen | |
| 2006/0254774 A1 | | 11/2006 | Saini | |
| 2006/0289160 A1 | | 12/2006 | van Batenburg | |

FOREIGN PATENT DOCUMENTS

| | | |
|---|---|---|
| EP | 0654582 B1 | 1/1999 |
| WO | 0070186 A1 | 11/2000 |
| WO | 03029613 A1 | 4/2003 |

OTHER PUBLICATIONS

SPE 13563—R.F. Scheuerman; A Buffer-Regulated HF Acid for Sandstone Acidizing to 550 Degrees Farenheit; Society of Petroleum Engineers; Feb. 1988; pp. 15-21.
SPE 74678—T. Huang, P.M. McElfresh and A.D. Gabrysch; Acid Removal of Scale and Fines at High Temperatures; Society of Petroleum Engineers; 2002; SPE Oilfield Scale Symposium in Aberdeen, United Kingdom; Jan. 30-31, 2002.
SPE 25161—J.S. Rhudy; Removal of Mineral Scale From Reservoir Core by Scale Dissolver; Society of Petroleum Engineers; 1993; SPE International Symposium on Oilfield Chemistry; New Orleans, Louisiana; Mar. 2-5, 1993.
SPE 65027—Wayne E. Frenier; Novel Scale Removers Are Developed for Dissolving Alkaline Earth Desposits; Society of Petroleum Engineers; 2001; SPE International Symposium on Oilfield Chemistry held in Houston, Texas; Feb. 13-16, 2001.
SPE 68924—W.W. Frenier, C.N. Fredd and F. Chang; Hydroxyaminocarboxylic Acids Produce Superior Formulations for Matrix Stimulation of Carbonates; 2001; SPE European Formation Damage Conference; The Hague, The Netherlands; May 21-22, 2001.
SPE 11188—C.M. Shaughnessy and W.E. Kline; EDTA Removes Formation Damage at Prudhoe Bay; Society of Petroleum Engineers of AIME; Oct. 1983; pp. 1783-1791.
SPE 63242—Wayne W. Frenier, David Wilson, Druce Crump and Ladell Jones; Use of Highly Acid-Soluble Chelating Agents in Well Stimulation Services; Society of Petroleum Engineers; 2001; SPE Annual Technical Conference and Exhibition in Dallas, Texas; Oct. 1-4, 2000.
Christopher N. Fredd and H. Scott Fogler; The Kinetics of Calcite Dissolution In Acetic Acid Solutions; Chemical Engineering Science; 1998; pp. 3863-3874; vol. 53 No. 22; Printed in Great Britian.
Christopher N. Fredd and Scott Fogler; Influence of Transport and Reaction on Wormhole Formation In Porous Media; AIChE Journal; Sep. 1998; pp. 1933-1949; vol. 44 No. 9.
Christopher N. Fredd and H. Scott Fogler; The Influence of Chelating Agents On The Kinetics of Calcite Dissolution; Journal of Colloid and Interface Science; 1998; pp. 187-197; Article No. CS985535; Copyright Academic Express.

* cited by examiner

Primary Examiner—Zakiya W. Bates
Assistant Examiner—Angela M DiTrani
(74) Attorney, Agent, or Firm—David Cate; Derk Fonseca; Robin Nava

(57) ABSTRACT

In a method of treating a sandstone-containing subterranean formation penetrated by a wellbore, a slurry of a carrier fluid containing a surface modification agent of at least one of a hydrolyzable organosilicon compound, a phosphonate compound or a combination of these is formed. The slurry is introduced into the wellbore at or above the fracture pressure of the formation. A sandstone-dissolving material is introduced into the wellbore with or subsequent to introduction of the slurry. The surface modification agent may be encapsulated within an encapsulating material. A composition for use in treating sandstone-containing subterranean formations is also provided. The composition includes an aqueous carrier fluid containing an encapsulated surface modification agent of at least one of a hydrolysable organosilicon compound and a phosphonate compound that is encapsulated within an encapsulating material.

15 Claims, 1 Drawing Sheet

METHODS AND COMPOSITIONS FOR SELECTIVELY DISSOLVING SANDSTONE FORMATIONS

BACKGROUND

The invention relates to stimulation of wells penetrating subterranean formations. More particularly it relates to acid fracturing; most particularly it relates to methods of differentially etching the fracture faces of sandstone formations so that etching provides a conductive path from the fracture tip to the wellbore.

The statements in this section merely provide background information related to the present disclosure and may not constitute prior art.

There exist several stimulation treatments for increasing production from hydrocarbon reservoirs, such as fracture stimulation. Proppant fracturing treatments consist of injecting fluid into a well at a certain rate and under a certain pressure for fracturing the reservoir and fixing the fracture with a propping agent that prevents the fracture from closing. This method is used for both carbonate and sandstone formations.

Acid fracturing is an alternative to proppant fracturing and is commonly used in the treatment of carbonate formations with the same objectives of creating long, open, conductive channels from the wellbore, extending deep into the formation. The difference between the two fracturing methods is in how the fracture conductivity is created and maintained. Fracture acidizing does not utilize proppant to hold the fracture open, but relies on the non-uniform etching of fracture faces with acid, resulting in the formation of conductive channels. Such acid fracturing has been reserved exclusively to carbonate formations.

The treatment of carbonate formations with acid works well because the favorable kinetics of carbonate dissolution by the acid. A variety of different acids may be used in treating carbonate formations. The etching of carbonate surfaces of the formation appears to be non-uniform due to inhomogeneities in the formation composition that lead to uneven reaction with the rock. This may result in disparities in the opposing fracture faces that do not match up when the fracture pressure is released so that "pillars" are formed that support the fracture wall after closure and provides conductive channels or flow paths to facilitate production of fluids from the formation to the wellbore.

In contrast to carbonate formations, sandstone formations are only susceptible to dissolution by hydrofluoric acid. The reaction-rate-limiting kinetics of sandstone dissolution by hydrogen fluoride results in uniform etching of the sandstone surfaces so that no pillars or channels of the formation are formed after the fracture has closed.

Accordingly, a need exists for a method for using acid fracturing techniques in sandstone formations to form conductive fractures.

SUMMARY

This invention relates to a method of treating a sandstone-containing subterranean formation penetrated by a wellbore. In one particular embodiment, a slurry of a carrier fluid containing a surface modification agent of at least one of a hydrolyzable organosilicon compound, a phosphonate compound or a combination of these is formed. The organosilicon material may be an organosilane, an amine of an organosilane and/or an ester of organosilane. The phosphonate compound may be a phosphonic acid or a salt or ester of a phosphonic acid. The slurry is introduced into the wellbore at a pressure at or above the fracture pressure of the formation. A sandstone-dissolving material is introduced into the wellbore with or subsequent to introduction of the slurry.

In another particular embodiment, the surface modification agent may be an encapsulated surface modification agent that is encapsulated within an encapsulating material.

A composition for use in treating sandstone-containing subterranean formations is also provided. The composition includes an aqueous carrier fluid containing an encapsulated surface modification agent of at least one of a hydrolyzable organosilicon compound or a phosphonate compound that is encapsulated within an encapsulating material.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
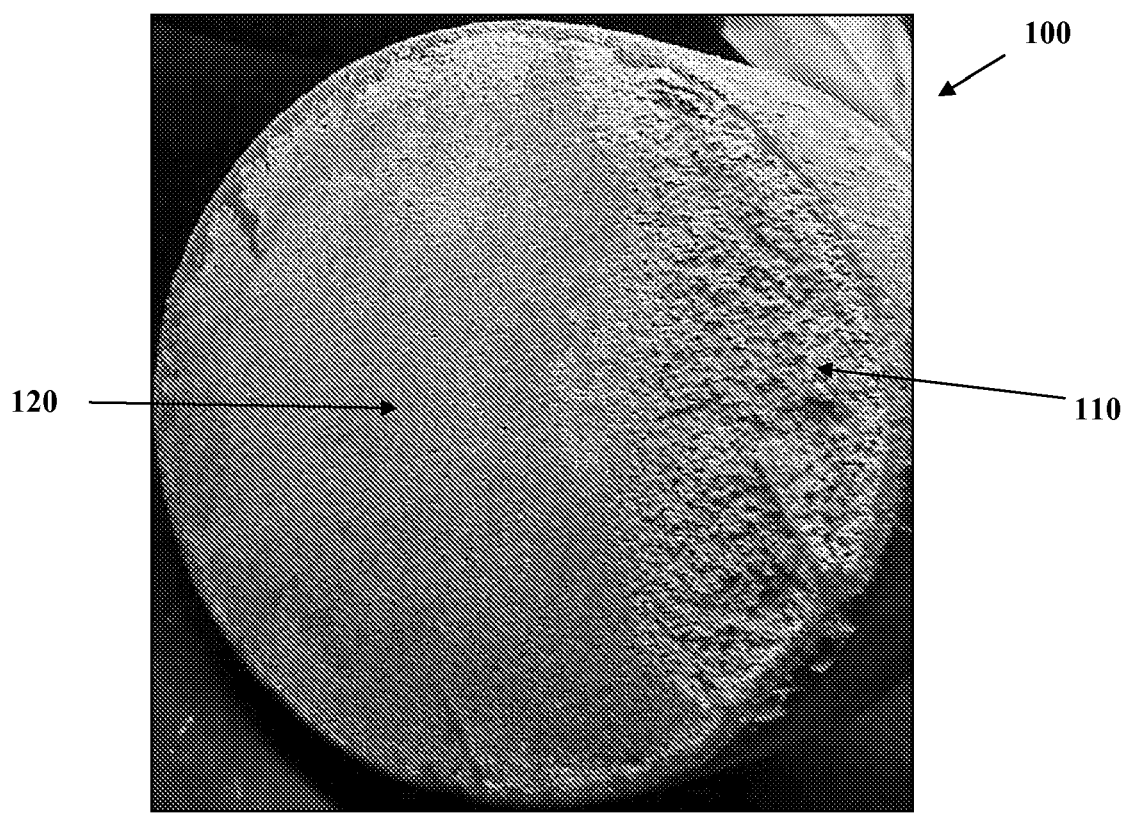
FIG. 1 shows the surface of a Berea sandstone core wherein one half of the core surface was treated with a surface modification agent prior to etching.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Due to the very slow kinetic dissolution of sandstone surfaces with hydrofluoric acid (HF), no differential etched pattern is created at the fracture faces of sandstone formations once treated with HF solution. As a result, without proppant materials, there is nothing preventing the fracture closure once pressure is released if attempts at acid fracturing of such formations are made.

Sandstone formations are typically comprised of quartz and clay components (e.g. 80% quartz, 20% clays), which are not readily dissolved by acids commonly used in the acid fracturing of carbonate formations. Typically, sandstone formations typically have a clay content of no more than 35% by weight. Typically minerals found in sandstone formations include quartz, feldspars, micas, clays (e.g. chlorite, kaolonite, illite, smectite), carbonates, sulfates, halites, iron oxides, etc. The present invention provides a method of preferentially etching some regions of the fracture surfaces created in sandstone formations in order to create a conductive path from the fracture tip to the wellbore.

In accordance with the present invention, a subterranean sandstone or siliceous formation penetrated by a wellbore is treated with a surface modification agent before or with treatment with an acid etching fluid. This is accomplished by injecting a surface modification material into the fracture that will adsorb physically and/or chemically onto some, but not all, portions of the fracture's surfaces. Physical adsorption of the material to the surface is by physical interactions between the surface and the material, such as through hydrogen bonding or electrostatic interactions. In contrast, chemical adsorption involves chemical interactions where covalent bonds between the surface and the material are formed. The regions of the fracture faces that are so modified are protected against the sandstone-dissolving or acid etching fluid that is pumped subsequent to the modification agent. In this way, the non-protected areas of the fracture wall react with the acid mixture, leaving behind "pillars" that maintain the fracture open and create a conductive channel.

The surface modification agent that protects against etching may be a hyrolyzable organosilicon compound. These materials may be solid or liquid. As used herein, the expression "hydrolyzable organosilicon" refers to those organosilicon materials that hydrolyze in an aqueous environment to form water-soluble silanols. Illustrative examples of suitable hydrolyzable organosilicon materials are described in U.S. Pat. Nos. 4,479,543, 4,646,835 and 6,632,805, each of which is incorporated herein by reference in its entirety.

The hyrolyzable organosilicon compounds may include amino silanes, vinyl silanes, esters of organosilanes and combinations of these. Specific examples of suitable organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, etc.

Specific examples of suitable esters of organosilanes include esters of organosilanes include divinyldimethoxysilane, divinyldi-β-methoxyethoxy silane, di(γ-glycidoxy propyl) dimethoxysilane, vinyltriethoxysilane, vinyltris-β-methoxyethoxysilane, γ-glycidoxypropyltrimethoxysilane, γ-methacryloxypropyltrimethoxysilane, β-(3,4-epoxycyclohexyl)ethyltrimethoxysilane, N-β-aminoethyl-γ-propylmethyldimethoxysilane, N-γ-aminoethyl-γ-propyltrimethoxysilane, N-β-aminoethyl-γ-aminopropyltrimethoxysilane, γ-aminopropyltriethoxysilane, N-(β-aminoethyl)-γ-aminopropyltrimethoxysilane, etc.

Esters of organosilanol containing amines may be particularly useful in the treatments of the invention. The amine functional group facilitates adsorption of the silane to the formation rock. Moreover, the length of the polysiloxane chain formed by polycondensation of the organosilanols is believed to be short. Such organosilane materials may be represented by the formula $Si(OR)_3(R'NH_2)$, where R and R' are hydrolyzable groups that are the same or different. The following illustrates the reaction of such materials with siliceous mineral materials to provide the protective coating thereon:

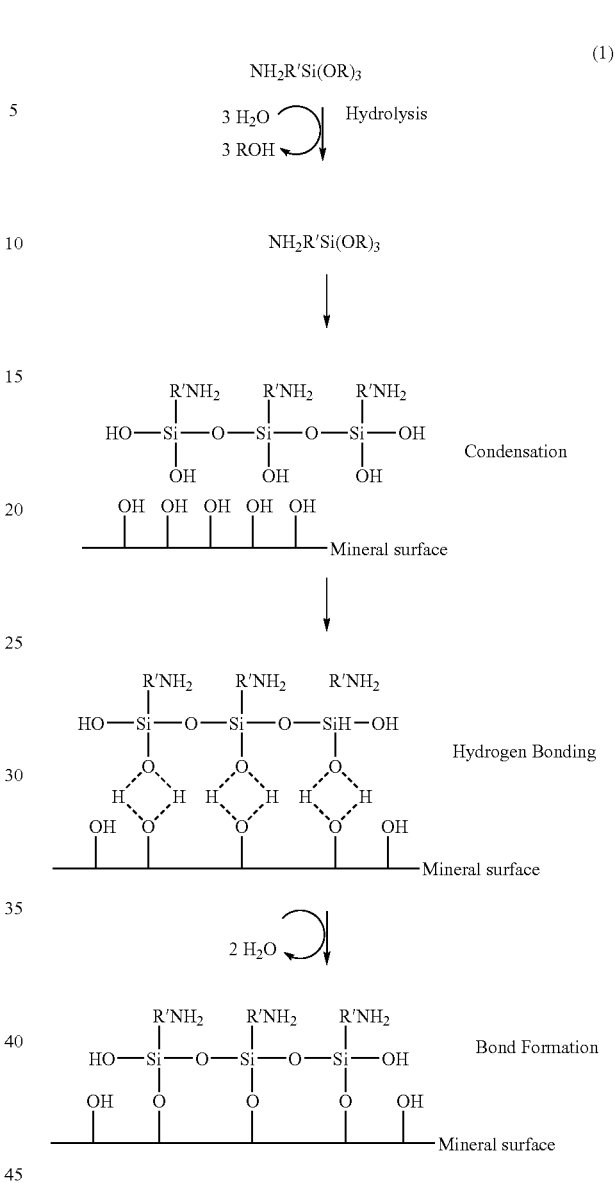

The silanols formed from the hydrolysis of the hydrolyzable organosilicon compound will react with each other and with the silanol (Si—OH) sites present on the siliceous mineral surfaces of the sandstone formation to form coavalent siloxane (Si—O—Si) bonds by the condensation/polymerization reaction, such as that shown in Equation 1 above. The silanol groups formed at the mineral surface will not be able to react with hydrofluoric acid (HF) present in the acid that is injected after the coating treatment, as is described in further detail later on.

Additionally, the surface modification agent may be a phosphonate compound. These behave similarly to the organosilanols in the manner in which they interact with the siliceous materials of the formation. The phosphonate materials may be in solid or liquid form. These materials may initially be in the form of solid particles. Such materials may include phosphonic acids and the salts and esters of phosphonic acids. Illustrative examples of suitable phosphonate compounds are described in U.S. Pat. No. 5,529,125, which is herein incorporated by reference in its entirety.

The phosphonate compounds may have a structure represented by the following formula:

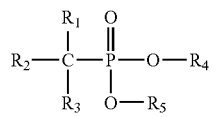 (2)

wherein $R_1$, $R_2$ and $R_3$ is each selected from one of a hydrogen, alkyl, aryl, phosphonate, phosphate, acyl, amine, hydroxyl or carboxyl group, and wherein $R_4$ and $R_5$ is selected from one of hydrogen, sodium, potassium, ammonium or an organic radical. Specific examples of suitable phosphonate compounds may include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt.

The surface modification agents may be used in either an encapsulated or non-encapsulated form. In many applications, the surface modification agent may be encapsulated. Encapsulation may further facilitate placement of the surface modification agents within the fracture so that they are released once placed within the fracture and not areas immediately adjacent to the wellbore, where they may react without such encapsulation. In the case of hydrolyzable organosilicon compounds that hydrolyze in aqueous fluids, the encapsulating material prevents premature formation of silanols within the carrier fluid where the carrier fluid is aqueous. In addition to preventing the copolymerization of silanols, this also facilitates promotion of heterogeneous coating of the fracture surfaces by creating regions of different silanol concentration.

Various types of encapsulating materials are encompassed within the invention. When an encapsulating material, the surface modification agent make up from about 50% to about 99% by total weight of the encapsulated particle, with the encapsulating material constituting from about 1% to about 50% by weight of the particle.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor(s) appreciate and understand that any and all data points within the range are to be considered to have been specified, and that the inventor(s) have possession of the entire range and all points within the range.

The particle size may vary depending upon the desired amount of surface modification agent to be released and/or the desired rate at which the encapsulating material is degraded, depending upon the release mechanism, as well as other factors. The encapsulated surface modification agent particles must be pumped downhole, and therefore, as a rule, the size of the capsules may be similar to those sizes typically used for proppant materials used in fracturing treatments. The particles used for a given treatment may be of the same or different sizes. Suitable particle sizes may range from about 0.1 mm to about 2 mm, more particularly from about 0.2 mm to about 1 mm, still more particularly from about 0.4 mm to about 0.85 mm (~20-40 mesh).

Various types of encapsulating materials are encompassed within the present invention. The encapsulating agent provides temporary encapsulation that subsequently releases the surface modification agent(s) under predetermined conditions. These conditions may include temperature, pH, pressure or other conditions that deteriorate, dissolve, degrade, penetrate, break or otherwise remove the encapsulating material. In the context of well stimulation, the coating material may release the encapsulated particles to the well treatment fluid essentially by the crushing of the capsules due to the closure of the formation. In other cases, the encapsulating material is degraded under the conditions of pressure and temperature existing in the subterranean formation. Of course, a combination of these release mechanisms, and others, such as osmosis, may also be used.

Suitable encapsulating materials may include soft plastic, wax, natural or synthetic rubber, latex, vermiculite, polyacrylamide, phenol formaldehyde polymer, nylon, starch, benzoic acid metals, naphthalene, natural or synthetic polymers, and natural or synthetic oil. Encapsulating of the surface modifying particles with these materials may depend upon the encapsulating materials themselves. Some of these materials may be sprayed on the surface modifying particles, which may be agitated in a fluidized bed, as a solution, molten material, emulsion, suspension, etc. The coating process would continue until the desired amount and/or thickness of the encapsulating layer is achieved The surface modification agent, either encapsulated or non-encapsulated, is combined with a carrier fluid to form a slurry. The carrier fluid may be any suitable fluid that allows the dispersed placement of the surface modification agent, liquid or solid, within the fracture to facilitate heterogeneous etching, as is described herein. The surface modification agent, encapsulated or non-encapsulated, may be used in an amount of from about 0.1% to about 30% by weight of the slurry.

If used in non-encapsulated form, a hydrocarbon carrier fluid may be used to facilitate heterogeneous placement of the non-encapsulated material within the fracture. Suitable carrier fluids include crude oil, aliphatic hydrocarbons, such as hexane, aromatic hydrocarbons, such as benzene, toluene, or petroleum distillation products or fractions, such as kerosene, naphthas or diesel fuel.

In many applications when the surface modification is used in encapsulated form, the carrier fluid may be an aqueous fluid sufficiently viscosified so that settling of the surface modifying agent particles does not occur. The carrier fluid may be a foamed or energized fluid, as well. Accordingly, viscosifying agents may be added to water or other aqueous fluids, such as a brine.

The viscosifying agent may be a polymer that is either crosslinked or linear, a viscoelastic surfactant, or any combination thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CM-HPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 2004/0209780A1, Harris et. Al., herein incorporated by reference.

In some embodiments, the viscosifier may be a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{18}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

When incorporated, the polymer-based viscosifier may be present at any suitable concentration to provide the desired dispersion of the surface modification agents. In certain embodiments, the viscosifying agent can be present in an amount of from about 0.1 wt. % to about 1.5 wt. % of total weight of treating fluid or less. The fluids incorporating the polymer may have any suitable viscosity, for example, a viscosity value of greater than about 20 mPa-s or greater at a shear rate of about 100 s−1 at treatment temperature, more particularly about 50 mPa-s or greater at a shear rate of about 100 s−1, and even more particularly about 75 mPa-s or greater. Depending upon the density of the surface modification materials, the viscosity required may be less than that used for suspending conventional proppant materials used in fracturing treatments.

In some embodiments of the invention, a viscoelastic surfactant (VES) is used as the viscosifying agent. The VES may be selected from the group consisting of cationic, anionic, zwitterionic, amphoteric, nonionic surfacatants and combinations thereof. U.S. Pat. Nos. 6,435,277 (Qu et al.) and 6,703,352 (Dahayanake et al.), each of which are incorporated herein by reference, describe non-limiting examples of suitable viscoelastic surfactants. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into fluids used in embodiments of the invention, the VES can range from about 0.2% to about 15% by weight of total weight of fluid, more particularly, from about 0.5% to about 15% by weight of total weight of fluid, more particularly, from about 2% to about 10% by weight of total weight of fluid. The lower limit of VES may be no less than about 0.2, 0.5, 0.7, 0.9, 1, 2, 3, 4, 5, 6, 7, 8, 9, 10, or 14 percent of total weight of fluid, and the upper limit may be no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid. Fluids incorporating VES based viscosifiers may have any suitable viscosity, for example, a viscosity value of about 20 mPa-s or greater at a shear rate of about 100 s−1 at treatment temperature, more particularly about 50 mPa-s or greater at a shear rate of about 100 s−1, and even more particularly about 75 mPa-s or greater. Again, depending upon the density of the surface modification materials, the viscosity required may be less than that used for suspending conventional proppant materials used in fracturing treatments.

The carrier fluid may be foamed or energized and contain "foamers," which may include surfactants or blends of surfactants that facilitate the dispersion of a gas into the composition to form of small bubbles or droplets, and confer stability to the dispersion by retarding the coalescence or recombination of such bubbles or droplets. Foamed and energized fluids are generally described by their foam quality, i.e. the ratio of gas volume to the foam volume. If the foam quality is between 52% and 95%, the fluid is conventionally called a foam fluid, and below 52%, an energized fluid. Thus, the fluids may include ingredients that form foams or energized fluids, such as, but not necessarily limited to, foaming surfactant, or blends of surfactants, and a gas which effectively forms a foam or energized fluid. Suitable examples of such gases include carbon dioxide, nitrogen, or any mixture thereof.

In etching of the sandstone formations, a sandstone-dissolving material is used to dissolve or etch the formation fracture faces. The sandstone-dissolving material is typically material that provides a source of hydrogen fluoride (HF), which etches the sandstone formation upon its release. Typically, a pH of less than 4 is desired to facilitate etching of the siliceous material of the fracture, more typically, a pH of from about 3 to 4 is used. The source of hydrogen fluoride may be a solid material. The solid hydrogen fluoride source may be substantially insoluble or only slightly or slowly soluble in basic or approximately neutral aqueous fluids. In acidic aqueous fluids, i.e. pH less than 5, the hydrogen fluoride source material releases hydrogen fluoride and may optionally slowly dissolve, completely or in part. Examples of such solid hydrogen fluoride sources are hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers (e.g. TEFLON), and combinations of these.

In certain embodiments of the invention, the source of hydrogen fluoride may be ammonium bifluoride, although others sources of hydrogen fluoride may be used, such as ammonium fluoride and hydrofluoric acid. When the hydrogen fluoride source is ammonium bifluoride, it may be present in the final slurry in an amount between about 10% and about 50% by weight, more particularly between about 15% and about 30% by weight, and still more particularly between about 20% and about 25% by weight. When the hydrogen fluoride source is ammonium fluoride, greater amounts may be used. For ammonium fluoride, it may be present in the final slurry in an amount between about 20% and about 60% by weight, more particularly between about 30% and about 50% by weight, and still more particularly between about 35% and about 45% by weight.

In most cases, the hydrogen fluoride source is combined with an acid-based fluid. The acid-based fluid may be an aqueous fluid that is acidized with non-HF acids or non-HF acid precursors. This may include mixtures of different acids. Such mixtures or solutions employing hydrofluoric acid and at least one other acid are commonly referred to as "mud acids" and are well known to those skilled in the art. The non-HF acids used may include, but are not limited to, hydrochloric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, malic acid, maleic acid, methylsulfamic acid, chloroacetic acid, 3-hydroxypropionic acid, polyaminopolycarboxylic acid, bisulfate salts and combinations of these.

The acids may be used in an amount to provide a pH of about 4 or less once injected into the formation. The initial pH at the surface may be higher than the pH of fluid after it is introduced into the formation. Lower pH may be achieved subsequent to introduction of the slurry into the formation due to higher temperatures.

The sandstone-dissolving material treatment fluids may be viscosified. Those viscosifying agents previously described above may be used with the sandstone-dissolving materials.

Chelating agents may also be added with the sandstone-dissolving treatment fluid to prevent undesired precipitation of various materials with metal ions resulting from the reaction of the hydrofluoric acid with the formation in an amount of from about 10% to about 40% by weight of the treatment fluid. Suitable chelating agents include those described in U.S. Patent Publication No. 2004/00254079, which is herein incorporated by reference in its entirety. Examples of suitable chelating agents include malic acid, tartaric acid, citric acid, certain aminopolycarboxylate and polyaminopolycarboxylate chelating agents (such as, by non-limiting example, NTA (nitrilotriacetic acid), HEIDA (hydroxyethlimnodiacetic acid), HEDTA (hydroxyethylethylenediaminet-etraacetic acid, EDTA (ethylenediaminetetraacetic acid), CyDTA (cyclohexylenediaminetetraacetic acid), DTPA (diethylenetriaminepentaacet-ic acid)) and certain aminopolymethylenephosphonic acid chelating agents and some of their salts, and mixtures of these.

Corrosion inhibitors may also be added to the sandstone-dissolving treatment fluids. Conventional corrosion inhibitors may be used as long as they are compatible with chemicals present in, or generated during use by, the slurry. Compounds containing ammonium quaternary moieties and sulfur compounds may be suitable (see for example U.S. Pat. No. 6,521,028).

Other additives commonly used in oilfield treatment fluids, such as friction reducers, clay control additives, wetting agents, fluid loss additives, emulsifiers, agents to prevent the formation of emulsions, foaming agents, scale inhibitors, fibers, breakers and consolidating materials, may also be used. It is to be understood that whenever any additives are included, laboratory tests may be performed to ensure that the additives do not affect the performance of the fluid.

In treating a sandstone formation to provide heterogeneous etching, the slurry containing the surface modification agent, encapsulated or non-encapsulated, along with any additives, may be formed at the surface. All of the different components may be individually manufactured, stored, transported to a job site, and added in any order to the carrier fluid to make the surface modification treatment slurry that is then injected into a well. The slurry may be batch mixed or mixed on-the-fly.

Various methods may be used for placement of the surface modifying material into the formation. The surface modifying material may be placed during the PAD treatment. The formed slurry is injected into the formation at a pressure and rate sufficient to fracture the portion of the formation being treated. The well may then be shut in for a period of time, maintaining the pressure at or above the fracture pressure. The shut in time may be from an hour or more, but is typically from about 1 to about 24 hours. This allows time for the surface coating agent to react with or adhere to the mineral surfaces of the fracture. For certain encapsulated surface modifying agents, such as those coated with the solid polymer acid precursors, the period of shut in may allow the encapsulating material to degrade to release the surface modifying agent, and for the surface modifying agent to react or adhere to the fracture faces. Additives and other conditions may be selected or introduced or otherwise combined with the slurry to facilitate degrading or removal of the encapsulating material once the encapsulated surface modifying agent is introduced into the fracture.

The surface modification may also be injected after PAD treatment. Typically in fracturing treatments, injection of a fluid ahead of the main treatment fluid may be employed to create width. A PAD may be used in the present invention to ensure that the fracture is wide enough for the solids in the surface modification treatment fluid to enter, but optionally the pad stage may be eliminated. The PAD may be any viscous fluid, such as fluids viscosified with polymers, crosslinked polymers, VES, and foams.

After a sufficient period of time has elapsed to allow the surface modification agents to react or adhere to the fracture faces, the sandstone-dissolving material previously described is introduced into the formation through the wellbore. The sandstone-dissolving material is also introduced at a pressure and rate sufficient to maintain the fracture open of the portion of the formation being treated. The pressure is maintained until sufficient time has elapsed for the sandstone-dissolving material to etch the fracture faces. The surface modification agent will protect some portions of the fracture faces, leaving the remaining portions exposed to the sandstone-dissolving material. This results in the heterogeneous etching of the fracture faces so that when the pressure is released and the fracture closes, flow channels within the fracture are formed. This results in greater production of fluids from the fracture, which are removed through the wellbore.

In other embodiments, the surface modification can be placed in the formation after the PAD treatment, but together with the sandstone-dissolving material. The PAD, surface modification agent and sandstone-dissolving material may also be introduced together in one stage.

The following examples serve to further illustrate the invention.

EXAMPLES

Example

A Berea sandstone core was first pre-treated with a solution of organosilane before etching with a solution of ammonium bifluoride. Solid cylindrical disks of Berea sandstone measuring approximately 4" (10 cm) in diameter and 0.8" (2 cm) thick were cut from commercially obtained cylindrical cores. The organosilanol was provided by a solution of 3-aminopropyltriethoxysilane in HCl, which was applied to only one half of the core surface. The core surface was allowed to react with the surface modifying agent in an oven at about 225° F. (107° C.) for 3 hours. The treated core was then removed from the oven and was allowed to cool.

The core was then were saturated with a solution of 5 wt % $NH_4Cl$. Static cell loading tests were performed in a Parr pressure reactor. A solution of 23 wt. % ammonium bifluoride and 11.7 wt. % polylactic acid was added on top of the bottom core that was placed in the cell reactor. Polylactic acid (PLA) was used to acidize the fluid and was used as particles having a particle size of 20-40 mesh (~0.84 mm to 0.42 mm) and had a molecular weight of from 100 to 1000 kDalton supplied by NatureWorks LLC. A top core was pressed against the material pack and the cell was pressurized to 300 psi (~2068 kPa). The system was heated to 300° F. and kept at temperature and pressure for 4 hours. The cell was cooled and depressurized.

FIG. 1 shows the surface of the core 100 observed after treatment. Only a portion 110 of the surface was etched by the acid, which corresponds to the region of the core surface that was not protected with the surface coating agent. The region protected with the surface coating agent is shown at 120.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a sandstone-containing subterranean formation penetrated by a wellbore comprising:
   forming a slurry of a carrier fluid containing a surface modification agent of at least one of a hydrolyzable organosilicon compound, a phosphonate compound or a combination thereof;
   introducing the slurry into the wellbore at a pressure at or above the fracture pressure of the formation; and then
   introducing a sandstone-dissolving material not comprising a surface modification agent into the wellbore subsequent to introduction of the slurry
   the surface modification agent is an encapsulated surface modification agent that is encapsulated within an encapsulating material.

2. The method of claim 1, wherein:
   the encapsulating material is at least one of soft plastic, wax, natural or synthetic rubber, latex, vermiculite, polyacrylamide, phenol formaldehyde polymer, nylon, starch, benzoic acid metals, naphthalene, natural or synthetic polymers, natural or synthetic oil.

3. The method of claim 1, wherein:
   the encapsulated surface modification agent has a particle size of from about 0.1 mm to about 2 mm.

4. A method of acid fracturing and differentially etching regions of fracture surfaces in sandstone formations, said etching providing a conductive path from the fracture tip to the wellbore comprising the steps of
   a) first injecting a first fluid selected from an aqueous fluid comprising a surface modification material comprising a hydrolyzable organosilicon compound or a mixture of a hydrolyzable organosilicon compound and a phosphonate compound, and a fluid comprising a phosphonate compound, into the fracture at a pressure above fracture pressure, then
   b) allowing said modification material to adsorb onto portions of the fracture surfaces creating protected portions and non-protected portions of the fracture surfaces, and then
   c) injecting a second fluid comprising a sandstone-dissolving material, said fluid not comprising a surface modification material, into the wellbore,
   wherein non-protected areas of the fracture surfaces react with the sandstone-dissolving material and create the conductive path.

5. The method of claim 4, wherein:
   the sandstone-dissolving material is ammonium bifluoride.

6. The method of claim 4, wherein:
   the sandstone-dissolving material comprises an acid-based fluid and a hydrogen fluoride source.

7. The method of claim 6, wherein:

the acid-based fluid includes hydrochloric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, malic acid, maleic acid, methylsulfamic acid, chloroacetic acid, 3-hydroxypropionic acid, polyaminopolycarboxylic acid, bisulfate salts and combinations of these.

8. The method of claim 6, wherein:

the hydrogen fluoride source is selected from ammonium fluoride, ammonium bifluoride, hydrofluoric acid, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.

9. The method of claim 4, wherein:

the organosilicon material is at least one of an organosilane, an amine of an organosilane or an ester of organosilane.

10. The method of claim 4, wherein:

the organosilicon has a structure represented by the formula $Si(OR)_3(R'NH_2)$, where R and R' are each organic groups that are the same or different.

11. The method of claim 4, wherein:

the phosphonate compound is a least one of a phosphonic acid or a salt or ester of a phosphonic acid.

12. The method of claim 4, wherein:

the phosphonate compound has a structure represented by the formula:

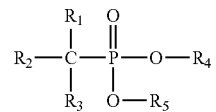

wherein $R_1$, $R_2$ and $R_3$ is each selected from one of a hydrogen, alkyl, aryl, phosphonate, phosphate, acyl, amine, hydroxyl or carboxyl group, and wherein $R_4$ and $R_5$ is selected from one of hydrogen, sodium, potassium, ammonium or an organic radical.

13. The method of claim 4, wherein:

the surface modification agent in the first fluid makes up from about 0.1% to about 30% of the slurry.

14. The method of claim 4, wherein:

an increase in the production of fluids from the wellbore follows the introduction of the sandstone-dissolving material.

15. A method of acid fracturing a sandstone-containing subterranean formation penetrated by a wellbore comprising:

forming a slurry of an aqueous carrier fluid containing an encapsulated surface modification agent of at least one of a hydrolyzable organosilicon compound or a phosphonate compound encapsulated within an encapsulating material;

introducing the slurry into the wellbore above fracture pressure;

shutting in said wellbore at or above fracture pressure for at least one hour, thereby allowing said encapsulated modification agent to adsorb onto portions of the fracture surfaces creating protected portions and non-protected portions of the fracture surfaces; and then introducing a sandstone-dissolving material into the wellbore.

* * * * *